(12) United States Patent
Paranjpe et al.

(10) Patent No.: US 11,744,269 B2
(45) Date of Patent: Sep. 5, 2023

(54) VEGETABLE AND FRUIT WASH FORMULATION AND USES THEREOF (71) Applicants: Vinay Bhalchandra Paranjpe, Dubai (AE); Donna Ruby Pancer Orense, Dubai (AE)

(72) Inventors: Vinay Bhalchandra Paranjpe, Dubai (AE); Donna Ruby Pancer Orense, Dubai (AE)

( * ) Notice: Subject to any disclaimer, the term of this patent is extended or adjusted under 35 U.S.C. 154(b) by 0 days.

(21) Appl. No.: 16/734,957

(22) Filed: Jan. 6, 2020

(65) Prior Publication Data

US 2021/0204571 A1 Jul. 8, 2021

(51) Int. Cl.
| A23L 3/3535 | (2006.01) |
| A23B 7/154 | (2006.01) |
| A23L 3/349 | (2006.01) |
| A23L 3/3562 | (2006.01) |

(52) U.S. Cl.
CPC ............ *A23L 3/3535* (2013.01); *A23B 7/154* (2013.01); *A23L 3/349* (2013.01); *A23L 3/3562* (2013.01)

(58) Field of Classification Search
CPC ...... A23L 3/3535; A23L 3/349; A23L 3/3562; A23B 7/154; A01N 37/44; A01N 43/16
See application file for complete search history.

(56) References Cited

U.S. PATENT DOCUMENTS

| 6,432,892 B2 | 8/2002 | Meine et al. |
| 8,999,175 B2 | 4/2015 | Man et al. |
| 10,196,556 B2 * | 2/2019 | Hatchman ................ C09K 8/58 |
| 2018/0118948 A1 * | 5/2018 | Dey ...................... C09B 62/365 |

FOREIGN PATENT DOCUMENTS

| CN | 102304441 B | 1/2012 | |
| CN | 103897882 A | 7/2014 | |
| CN | 104130878 A | 11/2014 | |
| CN | 104194956 A | 12/2014 | |
| CN | 104263549 A | 1/2015 | |
| CN | 105950311 A | 9/2016 | |
| CN | 107325891 A | 11/2017 | |
| CN | 107502475 A | 12/2017 | |
| CN | 108410851 A | 8/2018 | |
| CN | 109593614 A | 4/2019 | |
| WO | 1999037172 A | 7/1999 | |
| WO | WO-2012010406 A1 * | 1/2012 | ............... C11D 1/37 |

OTHER PUBLICATIONS

A Prabhune et al; Application of Sophorolipids Synthesized Using Lauryl Alcohol as a Germicide and Fruit-Vegetable Wash; World Journal of Pharmacy and Pharmaceutical Sciences, Jan. 2014, vol. 3, Issue 7, 1630-1643 (Year: 2014).*

* cited by examiner

*Primary Examiner* — Donald R Spamer
*Assistant Examiner* — Jeffrey D Benson
(74) *Attorney, Agent, or Firm* — The Dobrusin Law Firm, P.C.

(57) ABSTRACT

The present invention relates to an environment-friendly, safe and non toxic vegetable and fruit wash composition and its use. The vegetable and fruit wash composition of the present invention ensures removal of dirt, microorganisms, pesticides and/or insecticides from the surfaces of fruits and vegetables. The present composition is also effective in preventing early fruit ripening, crown-rot disease and fruit blackening thus contributes towards extending the life of the fruits/vegetables.

8 Claims, 2 Drawing Sheets

Figure 1: Shelf-Life Evaluation of Bananas

| DAY/s After Treatment | SAMPLE A<br>*Treated with plain water* | SAMPLE B<br>*Blank / Untreated* | SAMPLE C<br>*Treated with 1.25% VFW* |
|---|---|---|---|
| 0 |  |  |  |
| 2nd |  |  |  |
| 5th |  |  |  |
| 7th |  |  |  |
| 9th |  |  |  |
| 12th |  |  |  |

Figure 2: Bananas washed in various Vegetable and Fruit Washes made from the same ingredients.

VEGETABLE AND FRUIT WASH FORMULATION AND USES THEREOF

FIELD OF INVENTION

The present invention relates to an environment-friendly, non-toxic vegetable and fruit wash composition which ensures removal of dirt, wax residues, microorganisms, pesticides, insecticides, and fungicides from the surfaces of fruits and/or vegetables. Also, the present invention relates to prevention of early fruit ripening, crown-rot disease and fruit blackening thus increases their shelf life.

BACKGROUND OF THE INVENTION

Dhingra J S in 2010 reported that the farmers often use insecticides, fungicides and herbicides to save their crops from pests or fungal attacks, by spraying these chemicals either in powder or in emulsion form. They also use these chemicals prior to harvesting to increase the shelf life of the agricultural product.

Murch et al in 1996 reported 95% of consumers recognize the need for thorough washing of fruits and vegetables but ordinarily use tap water for the purpose, while the other 5% consumers wash their fruits and vegetables with some household cleaners, typically a liquid dishwashing product, to help ensure cleanliness.

However, a plain water wash is not effective in removing the chemical residues of pesticides and insecticides from fruits and vegetables and also does not completely remove the microorganism population growing over fruits and vegetables.

The dishwashing products are made of synthetic surfactants instead of natural fats and oils which are engineered to break down waxes, oils, and dirt. They are designed to provide high, persistent suds which make it inconvenient to remove those chemical residues or suds from the vegetable and fruits which are retained on the surfaces of fruits or vegetables after their use and these toxicant residues do not solubilize in water and thus cannot be washed out from the surfaces of fruits and vegetables.

Additionally, the dishwashing products having synthetic surfactants dissolve the natural defense systems of fruits and vegetables which make them more vulnerable to infection and microbial attack which eventually progress towards early ripening, rotting and blackening of fruits and vegetables.

Vegetable and fruit wash or cleaning agents have been provided and designed to remove dirt, wax and harmful pesticide residues from the surfaces of fruits and vegetables. These cleaning agents either belong to a specially marketed commercial brand or can be a home recipe too. The home recipe vegetable and fruit washing agents include diluted hydrogen peroxide or vinegar, which again have serious consequences if used in excess.

CN105950311A discloses a fruit and vegetable washing salt and its preparation which comprises 80-90 parts of sodium chloride, 1-6 parts of sodium citrate, 0.2-0.8 part of citric acid fatty acid glyceride, 0.5-1 part of polyoxyethylenesorbitan monolaurate, 4-8 parts of polyglucoside, and 2-8 parts of cocamidopropyl betaine. The fruit and vegetable washing salt is disclosed to be used for cleaning fruits and vegetables by dissolving the salt in clear water in a ratio of 1:500 for 5-10 minutes. However, the invention failed to disclose removal of any microflora from the surfaces of fruits and vegetables.

CN107325891A discloses a low foam washing salt for all-natural green fruit and vegetable with special effect on removal of heavy metals. The washing salt is prepared from one or more of the following raw materials: sodium chloride, natural alkaloid (0.2-20 wt %), a plant-based surfactant (1-30 wt %), a preservative (0.01-5 wt %), deionized water (0-80 wt %) and an efficient heavy metal complexing agent (0.2-20 wt %). The invention is disclosed to include paraben and its derivatives as preservatives and EDTA salts as heavy metal complexing agents; whose prolonged use is harmful for health.

CN108410851A discloses an enzyme-containing washing agent for fruits and vegetables as well as a preparation method and applications of the enzyme-containing washing agent, which comprises pesticide degrading enzyme, a thickening agent, a buffer solution, a preservative and water, wherein a surfactant is composed of APG0810, CAB-35, AEC-9Na and LAD-30; the thickening agent is sodium alginate; the citrate buffer solution is composed of citric acid and sodium citrate. The washing agent of the invention is disclosed to remove the harmful bacteria, effectively removes wax, maximizes the preservation of enzyme activity, has the effect of completely degrading pesticides, and has a foaming effect which is easy to rinse after washing vegetables and fruits. However use of enzymes in the preparation of composition increases the cost of production of the product.

CN102304441B discloses an edible cleaning agent for fruits and vegetables which is prepared from the components in parts by weight: 15-35 parts of rice coat, 10-30 parts of plant fiber, 10-30 parts of vegetable protein and 5-25 parts of sodium chloride. This edible cleaning agent for fruits and vegetables can thoroughly remove residual pesticide, dust, oil stain, insect stain and other harmful substances on the surface of the vegetable or fruit, and has the functions of sterilization and heavy metal complexation to some extent.

CN104263549A discloses a fruit/vegetable detergent and a cleaning method which is prepared from 1-10 parts of active calcium, 4-30 parts of saccharide and 1-10 parts of sodium chloride. The preparation method comprises proportionally pulverizing the active calcium, passing through a 200-mesh screen, respectively passing the sodium chloride and saccharide through a 80-mesh screen, adding water into a proportioning pot, adding the active calcium while stirring, uniformly dispersing, slowly adding the saccharide and sodium chloride, diluting to 100 ml with water, stirring for 60-90 minutes, and canning. The cleaning method is however a tedious approach which comprises dilution of prepared detergent by 10 times with water, heating to 43-55 DEG C., impregnating the fruit/vegetable to be cleaned in the dilute solution for 1-10 minutes, taking out, and flushing with clear water. The detergent has the advantages of favorable solubility and favorable dispersity, can effectively remove pesticide residues, dirt and bacterial contamination on the fruit/vegetable surface, and has a preservation action on the fruit/vegetable.

US8999175B2 discloses a method of reducing a microbial population in an aqueous stream used for transporting or processing food product, which comprises a medium chain peroxycarboxylic acid composition comprising many synthetic chemical ingredients which includes about 0.5 to about 5 wt-% of peroxyoctanoic acid; about 1 to about 10 wt-% octanoic acid; about 5 to about 97 wt-% water; about 1 to about 20 wt-% of a anionic surfactant; about 6 to about 10 wt-% of $H_2O_2$; about 25 to about 30 wt-% inorganic acid; and about 1 to about 5 wt-% sequestrant.

CN104130878A discloses a fruit and vegetable cleaning agent with a fruit-wax-removing effect, and a preparation method which comprises the raw material components by weight: 1-30% of an anionic surfactant, 0.1-10% of a co-solvent, 0.1-10% of a viscosity adjusting agent, 0.01-5% of a chelating agent, 0.01-2% of a sterile antiseptic, and small amounts of other additives such as a light stabilizer, preservatives (benzoate salts) an antioxidant, an essence and deionized water.

CN107502475A discloses a special detergent for deeply cleaning fruits and vegetables which is prepared from 7-15 parts of cocamidopropyl betaine, 7-15 parts of alkyl glycoside, 3-7 parts of clove lilac extract, 3-6 parts of lotus leaf extract, 3-7 parts of opuntia streptacantha extract, 1-2 parts of alpha hydroxy acid, 2-5 parts of chelant, 0.5-2 parts of algal polysaccharides and 2-4 parts of beta-cyclodextrin. The composition however lacks preservative effect.

CN109593614A discloses a fruit-vegetable cleaning agent containing the raw materials in parts by weight: 80-90 parts of baking soda, 1-5 parts of a coconut oil plant active extract, 3-6 parts of alcohol ether glucoside and 6-9 parts of an anionic surfactant. The fruit-vegetable cleaning agent further comprises 2 to 10 parts of the vegetable bactericide which includes tea seed extract, aloe extract and acacia extracts.

CN103897882A discloses a preparation method of a fruit and vegetable washing agent which comprises the steps of adding 25-35 parts of alkylolamides type non-ionic surface active agent, 3-5 parts of cocoalkanoylamido propyl betaine and 8-10 parts of ethylene glycol in a reaction kettle, with a filling rate is 20-25 ml/min, and stirring after filling, with a stirring speed of 35 revolutions/min; standing for 35-45 min after stirring; and cooling at a temperature of less than 10 DEG C. and a rate of 15 revolutions/min in a standing process. The fruit and vegetable washing agent produced by the method of the invention is capable of removing pesticide residual hazards in the surface of foods such as vegetables and fruits, and also eliminating pesticide residual hazards. However, the washing agent of the invention is not disclosed to remove the microorganisms from the fruits and vegetable surfaces.

U.S. Pat. No. 6,432,892B2 discloses a water-based composition for cleaning fruit, vegetables, or meat, comprising one or more $C_{4-9}$ alkyl polyglycosides with Cocamidopropyl Amine Oxide in a fruit and vegetable wash composition comprising complexing agent, pH regulator, organic solvents and anti microbial agents.

WO1999037172A discloses a composition for increasing the shelf life of fruit, vegetable and animal produce which is also suitable for removing surface contaminants. The composition includes: (a) one or more surfactant(s), (b) one or more anti-microbial, fungicidal and/or fungistatic agent(s), (c) one or more buffering agent(s) and/or sequestering agent(s), (d) one or more anti-browning agent, and (e) one or more stabiliser(s) and/or processing additive(s). The anti browning effect of the composition was seen due to use of ascorbic acid, erythrobic acid and 4-hexylresorcinol.

CN104194956A discloses a green fruit and vegetable cleaning agent for removing residual pesticide which comprises 10-30% of alkyl glucoside, 2-5% of polyoxyethylene isosorbide monooleate, 1-4% of citric acid, 1-4% of malic acid, 0.5-2% of grapefruit seed extract, 0.5-2% of honeysuckle extract and the balance being sterile water.

Most of the vegetable and fruit washing agents which are effective in removing dirt, wax residues, chemical residues of pesticides along with micro-organisms and preserving for a long period; are provided with some synthetic ingredients like preservatives, complexing agents, stabilizers, anti-browning agents and antibiotics.

There is a dire need to provide a washing or cleaning agent composed of only natural and safe components, effective in removing of dirt, wax residues, pesticide residues, micro-organisms and also provides long time preservation by preventing early ripening, rotting and blackening of fruits and vegetables.

OBJECTIVES OF THE INVENTION

It is an object of the present invention is to provide an environment friendly, safe and non-toxic vegetable and fruit wash which is completely free of harmful chemicals like sulfates, dioxanes, chlorine, nitrosamine and any other solvents.

It is again an object of the present invention is to provide a vegetable and fruit wash which effectively removes the chemicals residues of insecticides and pesticides.

It is further an object of the present invention is to provide a vegetable and fruit wash which not only removes dirt and wax residues but effectively removes micro-organisms including bacteria and fungi.

It is another object of the present invention is to provide a vegetable and fruit wash which provides long time preservation to prevent early ripening, rotting and blackening of vegetables and fruits.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention.

In an aspect of the present invention, there is provided a vegetable and fruit wash composition which is effective in removing dirt, wax residues, pesticides residues and micro-organisms from the surfaces of vegetables and fruits along with provides long time preservation to prevent vegetables and fruits from early ripening, rotting and blackening, wherein the composition comprises 25-30% of a nonionic surfactant, 30-65% of an amphoteric surfactant and 5-15% of glycolipids.

It is also an aspect of the invention is to provide a method of preparation of the vegetable and fruit wash composition, where the process comprising the steps of: a. mixing nonionic surfactant and amphoteric surfactant to obtain a homogenous surfactant mixture; b. adding glycolipid biosurfactants to the homogenous mixture to obtain the concentrated vegetable and fruit wash formulation.

In another aspect of the invention there is provided a method to wash vegetables and fruits, the method comprises washing or dipping of fruits and/or vegetables in 1-3% aqueous solution of VFW composition for 1-30 minutes.

DETAILED DESCRIPTION OF THE INVENTION

The present invention relates to a vegetable and fruit wash composition which is environment friendly and non toxic, effectively removes dirt, wax, harmful chemical residues of pesticides and insecticides, micro-organisms and also provides a long time preservative effect which helps in storage of fruits and vegetables.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein is for the purpose of describing particular various embodiments only and is not intended to be limiting of various embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, expressions such as "at least one of," when preceding a list of elements, modify the entire list of elements and do not modify the individual elements of the list.

Described herein is a vegetable and fruit wash (VFW) composition, its preparation and method of application thereof.

The inventors of the present invention have provided a vegetable and fruit wash composition which is effective in removing dirt, wax residues, pesticides residues and micro-organisms from the surfaces of vegetables and fruits.

It is quite common to use chemicals like sulfates, dioxanes, chlorine, nitrosamine and organic solvents in vegetable and fruit wash agents for complete removal of chemical residues of pesticides and insecticides, but those also provides harmful impact on humans.

In an embodiment of the present invention there is provided a vegetable and fruit wash composition which does not contain any harmful chemicals like sulfates, dioxanes, chlorine, nitrosamine or any other solvents except water.

Use of natural surfactants or bio-surfactants in a vegetable and fruit wash formulation is quite popular these days in order to provide a non-toxic cleaning agent. However, natural surfactants and biosurfactants are often accompanied with other agents which includes preservatives, stabilizers, antioxidants, antibiotics in order to provide a complete cleaning effect along with preservative effect which help in keeping the vegetables and fruit fresh for a longer time period.

The inventors of the present invention have provided a vegetable and fruit wash composition which is purely a composite of surfactants which includes natural surfactants and bio-surfactants only and there is no further addition of any other chemical agents for example preservatives, stabilizers, antioxidants and antibiotics to provide the preservative effect of the composition.

In an embodiment of the present invention, there is provided a vegetable and fruit wash composition consisting of a composite of natural surfactants and biosurfactants, which is effective in removing dirt, wax residues, pesticides, insecticides and micro-organisms.

There is provided a VFW composition, consisting of a nonionic surfactant in an amount of 25-30 wt %, an amphoteric surfactant in an amount of 30-65 wt % and glycolipids in an amount of 5-15 wt %.

In an embodiment of the present invention there is provided a vegetable and fruit wash composition consisting of a nonionic surfactant in an amount of 25-30 wt %, an amphoteric surfactant in an amount of 30-65 wt % and glycolipids in an amount of 5-15 wt %.

The present invention provides a vegetable and fruit wash composition which comprises 25-30 wt % of a nonionic surfactant.

The non-ionic surfactants of the present invention may include but are not limited to alkyl glucoside or alkyl polyglucosides derived from C4-C18 alcohol, preferably C6-C12 alcohol and more preferably C8-C10 alcohol surfactant, or mixtures thereof.

In an embodiment of the present invention there is provided a vegetable and fruit wash composition comprising a nonionic surfactant in an amount of 25-30 wt %, wherein the nonionic surfactants are selected from the group of alkyl glucoside or alkyl polyglucosides derived from C4-C18 alcohol.

In a preferred embodiment, the vegetable and fruit wash composition comprises 25-30 wt % of alkyl glucoside or alkyl polyglucosides derived from C6-C12 alcohol.

In a more preferred embodiment, the vegetable and fruit wash composition comprises 25-30 wt % of alkyl glucoside or alkyl polyglucosides derived from C8-C10 alcohol.

The present invention discloses a vegetable and fruit wash composition which comprises 30-65 wt % of an amphoteric surfactant.

The amphoteric surfactants of the present invention may include but are not limited to cocamidopropyl (amide) betaine or cocoaminobetaine, cocoamido hydroxypropyl sultaine, cocoamphodiacetate, preferably cocamidopropyl (amide) betaine or cocoamido hydroxypropyl sultaine.

In an embodiment of the present invention there is provided a vegetable and fruit wash composition comprising an amphoteric surfactant in an amount of 30-65 wt %, wherein the amphoteric surfactants are selected from the group of cocamidopropyl (amide) betaine or cocoaminobetaine, cocoamido hydroxypropyl sultaine, cocoamphodiacetate.

In a preferred embodiment, the vegetable and fruit wash composition comprises 30-65 wt % of cocamidopropyl (amide) betaine.

In another preferred embodiment, the vegetable and fruit wash composition comprises 30-65 wt % of cocoamido hydroxypropyl sultaine.

The present invention discloses a vegetable and fruit wash composition which comprises 5-15 wt % of a glycolipid as a biosurfactant.

The glycolipid of the present invention may include but are not limited to sophorolipid, and rhamnolipid, or mixtures thereof.

In an embodiment of the present invention there is provided a vegetable and fruit wash composition comprising a glycolipid in an amount of 5-15 wt %, wherein the glycolipids are selected from the group of sophorolipid, and rhamnolipid, or mixtures thereof.

In a preferred embodiment, the vegetable and fruit wash composition comprises 5-15 wt % of sophorolipid.

The present invention provides a vegetable and fruit wash composition which consists of 25-30% of a nonionic surfactant, 30-65% of an amphoteric surfactant and 5-15% of glycolipids, wherein the nonionic surfactant comprises alkyl glucoside or alkyl polyglucosides alcohol and the amphoteric surfactant comprises Betaines or Sultaines or mixtures thereof.

The vegetable fruit wash (VFW) composition in accordance with the present invention has the composition as mentioned in Table 1 below:

TABLE 1

Components of the Vegetable and Fruit Wash

| Sr. No. | Material Name | Concentration |
| --- | --- | --- |
| 1 | Alkyl Polyglucoside with 4-18 Carbon Chain | 25-35% |
| 2 | Cocoamidopropyl (Amide)Betaine | 30-65% |
| 3 | Glycolipid | 5-15% |

It is an embodiment of the present invention to provide a vegetable and fruit wash composition which contains 25-30% of alkyl glucoside or alkyl polyglucosides derived from C8-C10 alcohol, 30-65% of cocamidopropyl (amide) betaine and 5-15% of glycolipid.

In an embodiment of the present invention there is provided a method of preparation of the vegetable fruit wash composition.

The present invention provides a method for preparation of the vegetable and fruit wash composition under the following steps:
  i. mixing nonionic surfactant and amphoteric surfactant to obtain a homogenous surfactant mixture;
  ii. adding glycolipid biosurfactants to the homogenous mixture to obtain the concentrated vegetable and fruit wash formulation.

The prepared VFW composition of the present invention is further analyzed for its specific features with following parameters as described in Table 2.

Determination of pH: 1 g of the above composition was added individually to 10 ml of water and the solution was then tested for pH using pH meter.

Determination of organoleptic properties: The above sample was tested for colour, and texture.

TABLE 2

Specifications of Vegetable & Fruit Wash

| Physical Parameter | Specifications |
| --- | --- |
| Appearance @ 25° C. | Yellowish Liquid |
| pH | 6.5-9.0 |
| Relative density | ~1.04 gm/ml |

The inventors of the present invention have provided a vegetable and fruit wash composition which is yellowish in appearance, having pH in between 6 and 9; and relative density approximately 1.04 gm/ml (close to water).

The present invention provides a vegetable and fruit wash composition, which is safe and non toxic enough to be consumed after its use on fruits and vegetables without further washing in water.

The cytotoxicity evaluation of Vegetable and fruit wash has been done by SRB Assay on 3T3 cell line. Cell cytotoxicity study refers to the ability of certain chemicals or mediator cells to destroy living cells.

The $IC_{50}$ values are not obtained under the cell cytotoxicity studies till 200 μg/ml concentration of the vegetable and fruit wash composition. Hence, the Vegetable and Fruit Wash composition is considered absolutely safe on the skin below 200 μg/ml.

It is an embodiment of the invention to provide a safe and non toxic vegetable and fruit wash composition which is absolutely safe on skin below 200 μg/ml concentration.

It is also an embodiment of the invention to provide a safe and non toxic vegetable and fruit wash composition which after application over vegetables and fruits does not require washing again in water and can be consumed as such.

The inventors of the present invention have provided a vegetable and fruit wash composition which consists of environment friendly surfactants and tends to degrade biologically.

The biodegradability test of the VFW composition has been done using a microbial biodegradation process by OECD 302B method. This is an international standard for determining the biodegradability potential of a substance. This is done by using an activated sludge and monitoring the Chemical Oxygen Demand (COD) for duration of 28 days.

The vegetable and fruit wash composition of the invention shows 81.20% biodegradability in 28 days as per OECD 302B test method, which shows that the vegetable and fruit wash composition is readily biodegradable and does not provide any harmful impact on environment too.

In an embodiment of the present invention, there is provided a vegetable and fruit wash composition which readily biodegrades and does not provide any harmful impact on environment.

The present invention provides a vegetable and fruit wash composition which naturally degrades by 81% in 28 days.

The present invention provides a vegetable and fruit wash composition which effectively removes dirt, wax residues and harmful insecticides and pesticides from the surfaces of vegetables and fruits.

Residual pesticides and insecticides on fruits and vegetables have become a huge problem for agriculture industries around the globe. Most of the pesticides and insecticides used in farming cannot be washed and removed easily. Farmers, however, are forced to keep applying the same on their crops to keep it away from possible attacks of insects and pests.

In an embodiment of the present invention there is provided a vegetable and fruit wash composition which is effective in washing out the insecticides and pesticides present on the surfaces of vegetables and fruits.

The potential of the composition in removing the harmful insecticides and pesticides from the surfaces of fruits and vegetables have been studied separately on fruits and vegetables and are further analyzed for the presence of insecticides and pesticides by LCMS technique.

It was found by the inventors that at minimum 1.0% concentration of the composition in water are effective in removing 90.17% of the combined pesticides and insecticides from the surfaces of vegetables and fruits.

The present invention provides a vegetable and fruit wash composition which is at 1-3% concentration in water is effective in removing 90% of insecticides and pesticides residues from the surfaces of vegetables and fruits.

The inventors of the present invention also studied the effect of vegetable and fruit wash composition in removing the insecticides/pesticides residues from the surface of tea leaves.

The vegetable and fruit wash composition is found to be effective at 1-3% concentration in water in removing more than 50% of insecticides/pesticides residues from the surfaces of tea leaves.

The present invention provides a vegetable and fruit wash composition and the formulation which effectively removes broad class microorganism from the surfaces of vegetables and fruits.

Most of the microorganisms present on raw fruits and vegetables are recovered post harvesting which perpetuate on crop debris in the field and under suitable conditions produce abundant spores. Micro-organisms such as *Escherichia coli, Staphylococcus aureus, Candida* and *Aspergillus* species are among the most important cause of decaying which affect harvested fruits and vegetables.

The anti-microbial efficacy of VFW composition is evaluated by finding its zone of inhibition against *Staphylococcus Aureus, Escherichia coli, Candida Albicans* and *Aspergillus Niger* and compared with zone of inhibition of standard antibiotics known to be very potent in eliminating the subject microorganism.

An antibacterial agent with minimum zone of inhibition of 15 mm and more is considered as antibiotic. An antibacterial agent with a minimum zone of inhibition of 10 mm and more is considered and called as disinfectant (Table 8).

TABLE 3

Different classes of antibacterial agent on the basis of zone of inhibition

| | Diameter of Zone of Inhibition in mm |
|---|---|
| Resistant (Not/Less Effective) | 10 mm or less |
| Intermediate (Moderately Effective) | 11-15 mm |
| Susceptible (Very Effective) | 16 mm or more |

The present invention in an embodiment provides a vegetable and fruit wash composition which at its 1-3% concentration in water is effective in removing broad class micro-organisms.

The microorganisms population present over the surfaces of vegetables and fruits play an important role in ripening and then decaying of vegetables and fruits.

Present invention provides a vegetable and fruit wash solution which prevents premature ripening of vegetables and fruits by removing broad class microorganisms from the surface of vegetables and fruits.

Surprisingly, it has been found by the present inventors that the vegetable and fruit wash solution not only removes broad class microorganisms from the surfaces of vegetables and fruits but also helps in controlling the ripening and thus decaying of vegetables and fruits in storage conditions.

In an embodiment of the present invention there is provided a method to prevent premature ripening of vegetables and fruits by removing the broad class microorganisms from the surfaces of vegetables and fruits.

Premature ripening has been studied in case of Banana which commonly exhibits "Crown-Rot" disease caused by a fungus (*Fusarium* sp. and *Colletotrichum musae*) which can survive in the soil indefinitely. As crown rot progresses, fruits like banana begins to soften and blacken and induces early ripening of fruits.

The crown-rot and fruit blackening studies are conducted to determine the efficacy of the Vegetable and Fruit Wash to protect the fruits from the so-called disease and also from premature ripening. This study is also conducted to determine the efficacy of the present invention in prolonging the life of the fruits, i.e. in increasing the shelf life of the fruits.

The vegetable and fruit wash composition at 1-3% concentration in water is found to prevent blackening and rotting of bananas.

The present invention further provides a vegetable and fruit wash composition which is at 1-3% concentration in water is effective in preventing crown rot disease in banana.

The present invention thus provides a vegetable and fruit wash composition comprising 25-30 wt % of nonionic surfactants, 30-65 wt % of amphoteric surfactant and 5-15 wt % of glycolipids, which is effective at 1%-3% concentration in per 100 ml water in removing dirt, wax residues, insecticide/pesticide residues, broad class microorganisms from the surface of vegetables and fruits.

In an embodiment of the present invention, there is provided a method of washing vegetables and fruits by dipping the vegetables and fruits in 1-3% of vegetables and fruits wash aqueous solution for 1-30 minutes, wherein, the fruit and wash composition comprises 25-30% of a nonionic surfactant, 30-65% of an amphoteric surfactant and 5-15% of glycolipids.

The present invention provides a method of washing removes dirt, wax residues, insecticides/pesticides residues and broad class microorganisms from the surface of vegetables and fruits, where the method comprises dipping the vegetables and fruits in aqueous solution of 1-3% of vegetables and fruits wash composition for 1-30 minutes.

The method of is found effective in preventing premature ripening of fruits and thereby increases the shelf life of fruit.

Henceforth, embodiments of the present disclosure are explained with one or more examples. However, such examples are provided for the illustration purpose for better understanding of the present disclosure and should not be construed as limitation on scope of the present disclosure.

EXAMPLES

Example 1: Cytotoxicity Study of the Vegetable and Fruit Wash Composition

The SRB assay is based on binding of the dye to basic amino acids of cellular proteins, and colorimetric evaluation provides an estimate of total protein mass, which is related to cell number. The assay is performed in a 96 well tissue culture plate. The duration of the assay is 3 days. The cells are seeded into the plate and after that are sub confluent. They are treated with the test material for 24 hours. The cells are fixed and stained with Sulforhodamine B which is a protein stain. The colour is read at 570 nm using a plate reader. Table 4 depicts the percent viabilities of cells at different concentrations of vegetable fruit wash composition.

TABLE 4

Percent viabilities at different concentrations of vegetable fruit wash composition.

| Vegetable and Fruit Wash | Percent Viability | | | |
|---|---|---|---|---|
| Concentration | 100 μg | 125 μg | 150 μg | 200 μg |
| Experiment 1 | 95.82 | 101.89 | 89.43 | 50.85 |
| Experiment 2 | 103.92 | 96.11 | 89.61 | 66.86 |
| Experiment 3 | 91.98 | 97.66 | 85.16 | 60.98 |

The $IC_{50}$ values are not obtained under the cell cytotoxicity studies till 200 μg/ml concentration of the vegetable and fruit wash composition. Hence, the Vegetable and Fruit Wash composition is considered absolutely safe on the skin below 200 μs/ml.

Example 2: Biodegradability of the Vegetable and Fruit Wash Composition

Washed activated sludge from sewage treatment plant which is standardized is added to mineral medium and the appropriate amount of test substance. The test organism used for this study is Unadapted Inoculum. Blank comprises of activated sludge minus sample. One litre of suspension is aerated using humidified air to ensure that sludge does not settle and that the concentration of dissolved oxygen does not fall below 1 mg/L. The aeration is continued for the entire length of 28 days (4 weeks). The biodegradation of the test substance determines the COD in samples at 3 hours at start, followed by weekly intervals. Percentage biodegradability is calculated from the difference of COD in the sample at 3 hours after starting the test and the 28 days. Table 5 depicts the percent biodegradation of vegetable and fruit wash composition in 28 days.

TABLE 5

Percent biodegradation of vegetable and fruit wash in 28 days

| Number of Weeks | Percentage Biodegradability |
|---|---|
| 1 week | 0.00% |
| 2 weeks | 59.31% |
| 3 weeks | 70.44% |
| 4 weeks (28 days) | 81.20% |

The composition shows 81.20% biodegradability in 28 days as per OECD 302B test method, which shows that the vegetable and fruit wash composition is readily biodegradable and does not provide any harmful impact on environment too.

Example 3: Study on Efficacy of the Vegetable and Fruit Wash Composition in Removing Insecticides/Pesticides Residue The potential of the vegetable and fruit wash composition in removing the harmful insecticides and pesticides from the surfaces of fruits and vegetables have been studied separately on fruits and vegetables and are further analyzed for the presence of insecticides and pesticides by LCMS technique.

A. Study on Various Fruits (Apple, Banana, Chili, Orange)

Fruits are subjected to a combined insecticides treatment by dipping in their solution. The insecticides treatment contains a group of several insecticides, pesticides and fungicides.
1) Acetamiprid
2) Ametoctradin
3) Azoxystrobin
4) Buprofezin
5) Carboxin
6) Imidacloprid
7) Monocrotophos
8) 3 Hydroxy Carbofuran Each fruit is subsequently washed with water, alcohol (methanol), 0.5% of VFW solutions in water and 1% of VFW solution in water. Alcohol is known to remove nearly 100% of the pesticides and insecticides on fruits and vegetables. The water and alcohol washes are used as a reference for comparison to calculate the percentage of pesticides and insecticides removal.

The washed water/water solutions are collected for each washing agents and labelled as:
1) W1—Plain water wash
2) W2—alcohol wash
3) W3—0.5% of VFW solutions in water
4) W4—1% of VFW solutions in water.

The washed fruits are then crushed and evaluated for their residual pesticides and insecticides using a Liquid Chromatography—Mass Spectrometry (LCMS) and are labelled as:
1) F1—crushed fruits washed in W1
2) F2—crushed fruits washed in W2
3) F3—crushed fruits washed in W3
4) F4—crushed fruits washed in W4

The collected samples are analysed for the presence of insecticides and pesticides by LCMS technique. The results are tabulated and calculated accordingly. It is estimated that the total pesticides and insecticides on the fruits is equal to the sum of P&I in the washed solution and the residual P&I in crushed fruit. Table 6 shows a comparative data of the LCMS analysis for the presence of combined pesticide/insecticide in different washed samples.

TABLE 6

Comparative LCMS Analysis for the presence of combined pesticide/insecticide in different washed samples

| DESCRIPTION | P&I in WASHED SOLUTION (mg/Kg) | | Residual P&I in CRUSHED FRUITS (mg/Kg) | | Total P&I (mg/Kg) | Percentage P&I Removed |
|---|---|---|---|---|---|---|
| 1 Plain Water | W1 | 0.559 | F1 | 0.202 | 0.761 | 73.46% |
| 2 Solvent (Methanol) | W2 | 0.745 | F2 | 0.039 | 0.784 | 95.03% |
| 3 0.5% VFW | W3 | 0.612 | F3 | 0.159 | 0.771 | 79.38% |
| 4 1% VFW | W4 | 0.688 | F4 | 0.075 | 0.763 | 90.17% |

*Note
that P&I means pesticides and insecticides.

B. Study on Tea Leaves

The tea farmers carry a typical method to dry tea leaves post harvesting without washing the leaves, as it is believed that rain water can wash away the residual pesticides and insecticides. However, rain water is not effective enough to wash those insecticides/pesticides from the tea leaves. The efficacy of VFW on removing insecticides/pesticides from tea leaves is analyzed by comparing with dried tea leaves without any treatment.

Samples of dried tea leaves are submitted to a Pesticides Residue Laboratory for Residual Pesticides and Insecticides Analysis. The Laboratory used their in-house analytical method (TRA-KOL/PRLAB/SCOPE/SOP-02 & 04) to determine the residual values of the concerned pesticides and insecticides in Tea Industry. The results of the dried tea leave samples without any treatment are compared to the result of dried tea leaves washed in Vegetable and Fruit solution (Table 7).

TABLE 7

Comparative analysis in Green Tea Leaves without treatment and Green Tea Leaves washed with 1% Vegetable and Fruit solution.

| | Detected Quantity in mg/Kg | |
|---|---|---|
| Insecticides and Pesticides of Concern | Tea Leaves without Treatment | Tea Leaves washed with 1% VFW |
| Monocrotophos | 55.56 | 32.86 |
| Quinalphos | 376.81 | 185.37 |

Table 7 shows the comparative analysis of green tea leaves with and without treatment of VFW solution. The results show that the green tea leaves washed with 1% VFW solution has lesser residual insecticides and pesticides.

The Vegetable and Fruit Wash effectively removes more than 40.86% of Monocrotophos insecticide and more than 50.81% of Quinalphos pesticide.

TABLE 8

Comparative analysis in Premium Tea Leaves without treatment and Premium Tea Leaves washed with 1% Vegetable and Fruit solution.

| | Detected Quantity in mg/Kg | |
|---|---|---|
| Insecticides and Pesticides of Concern | Tea Leaves without Treatment | Tea Leaves washed with 1% VFW |
| Monocrotophos | 37.52 | 18.96 |
| Quinalphos | 7.64 | 7.37 |

The tests were carried out for premium tea leaves as well where 1% VFW solution effectively removed more than 50% of insecticides and pesticides (Table 8).

Example 4: Study on Efficacy of the Vegetable and Fruit Wash Composition in Removing Brad Class Microorganisms The anti-microbial efficacy of VFW composition is evaluated by finding its zone of inhibition against *Staphylococcus Aureus, Escherichia coli, Candida albicans* and *Aspergillus niger* and compared with zone of inhibition of standard antibiotics known to be very potent in eliminating the subject microorganism.

Zone of Inhibition Assay for *Staphylococcus aureus* ATCC 6538

*Staphylococcus aureus* is a gram-positive, round-shaped bacterium found as dominant genera on the surfaces of vegetables and fruits. The assay was performed for the culture of *Staphylococcus aureus* ATCC 6538. Ciplox is known to be very effective in eliminating this strain. It was used as standard antibiotic. Table 9 depicts the diameter of the zone of inhibition with different samples.

TABLE 9

Efficacy analysis against *Staphylococcus aureus* ATCC 6538

| Sample | Zone of Inhibition (mm) |
|---|---|
| Vegetable and Fruit Wash | 16.45 mm |
| Ciplox | 27.64 mm |
| Plate spread with culture | Growth observed |

A zone of inhibition of 16.45 mm is observed with VFW, which confirms its efficacy in reducing the strains of *Staphylococcus aureus* 6538 from the surface of fruits and vegetables.

In an embodiment of the present invention, there is provided a vegetable and fruit wash composition which is effective in removing *Staphylococcus aureus* from the surfaces of vegetables and fruits.

Zone of Inhibition Assay for *Escherichia coli* 8739

20-30% of food-poisoning outbreaks linked to disease causing strains of the bacterium *Escherichia coli* are caused by people eating contaminated vegetables. The assay was performed for the culture of *Escherichia coli* 8739. Gentamicin is known to be very effective in eliminating this strain and is used as standard antibiotic. Table 10 depicts the diameter of the zone of inhibition with different samples.

TABLE 10

Efficacy analysis against *Escherichia coli* 8739

| Sample | Zone of Inhibition (mm) |
|---|---|
| Vegetable and Fruit wash | 22.70 mm |
| Gentamicin | 24.54 mm |
| Plate spread with culture | Growth observed |

A zone of inhibition of 22.70 mm is observed with VFW solution in comparison to the antibiotic Gentamicin which shows 24.54 mm zone of inhibition. The result shows that VFW is almost equally effective to Gentamicin antibiotic in removing *Escherichia coli* 8739 from the surfaces of fruits and vegetables.

In an embodiment of the present invention, there is provided a vegetable and fruit wash composition which is very much effective in removing *Escherichia coli* from the surfaces of vegetables and fruits.

Zone of Inhibition Assay for *Candida albicans* 10231

*Candida albicans* is opportunistic pathogenic yeast found to have growth on fruits rich in sugar content like bananas, dates, grapes, mango, and dried fruit. The zone of inhibition assay is performed for the culture of *Candida albicans* 10231. Zinc pyrithione (ZPTO), fungistatic is used as standard sample and is known to be very effective in eliminating this strain. Table 11 depicts the diameter of the zone of inhibition with different samples.

TABLE 11

Efficacy analysis against *Candida albicans* 10231

| Sample | Zone of Inhibition (mm) |
|---|---|
| Vegetable and Fruit Wash | 14.33 mm |
| ZPTO | 24.37 mm |
| Plate spread with culture | Growth observed |

A zone of inhibition of 14.33 mm is observed with VFW solution. A value below 15 mm. shows that the VFW solution is moderately effective in reducing the strains of *Candida albicans* 10231 from the surface of fruits and vegetables.

In an embodiment of the present invention, there is provided a vegetable and fruit wash composition which is moderately active in removing *Candida albicans* from the surfaces of vegetables and fruits.

Zone of Inhibition Assay for *Aspergillus niger* 16404

*Aspergillus niger* is a fungus and causes disease called "black mold" on certain fruits and vegetables such as grapes, apricots, onions, and peanuts, and is a common contaminant of food. The zone of inhibition assay is performed for the culture of *Aspergillus niger* 16404. Table 12 depicts the diameter of the zone of inhibition with the sample of vegetable and fruit wash composition.

TABLE 12

Efficacy analysis against *Aspergillus niger* 16404

| Sample | Zone of Inhibition (mm) |
|---|---|
| Vegetable and Fruit Wash | 20.01 mm |
| Plate spread with culture | Growth observed |

A zone of inhibition of 20.01 mm is observed with VFW solution which states its strong efficacy in eliminating the strains of *Aspergillus niger* 16404 from the surface of fruits and vegetables.

In an embodiment of the present invention, there is provided a vegetable and fruit wash composition which is strongly active in removing *Aspergillus niger* from the surfaces of vegetables and fruits.

Example 5: Study on Efficacy of the Vegetable and Fruit Wash Composition in Preventing Crown Rot Disease The study on efficacy of the vegetable and fruit wash composition in preventing crown rot disease has been evaluated in A. In Banana Plantation A batch of bananas is washed using 2% of Vegetable and Fruit Wash solution in water. The bananas are soaked in the solution for 30 minutes maximum, rinsed, dried and packed and are observed after 2 weeks of washing and after 4 weeks of washing post-delivery and ripening. Another batch of bananas are washed using Sodium Hypochlorite (NaClO) solution in water as per the industry standard washing procedure. The bananas are soaked in the solution for 30 minutes maximum, rinsed, dried and packed. They are observed after 2 weeks of washing and after 4 weeks of washing post delivery and ripening. The data is tabulated and shown in Table 13.

TABLE 13

Crown Rotting Evaluation of Bananas washed in Industrial Set-up

| Samples | Number of Rotten Crowns 2 weeks after Washing | Number of Rotten Crowns 4 weeks after Washing | Number of Rotten Crowns after Ripening |
|---|---|---|---|
| Banana washed with 2% VFW solution in water | 0 | 0 | 0 |
| Banana washed with NaClO solution in water | 1 | 3 | 5 |

The results show no rotten bananas are found in batch washed with 2% of Vegetable and Fruit Wash solution in water.

The present invention provides a vegetable and fruit wash composition to prevent crown-rot disease in Banana in storage at an effective 2% concentration in water.

B. In-House Evaluation

Six Cavendish Bananas are procured from the market and divided into 3 sample parts:
1) 2 bananas are treated with water only. These bananas are dipped in water for 5 minutes then left in the room to dry. This batch is labeled as SAMPLE A.
2) 2 bananas are untreated and labeled as SAMPLE B.
3) 2 bananas are treated with 1.25% of Ecorich VFW solution in water by dipping in the Vegetable and Fruit Wash solution for 5 minutes and then leaving in room to dry and labeled as SAMPLE C.

Figure 1:
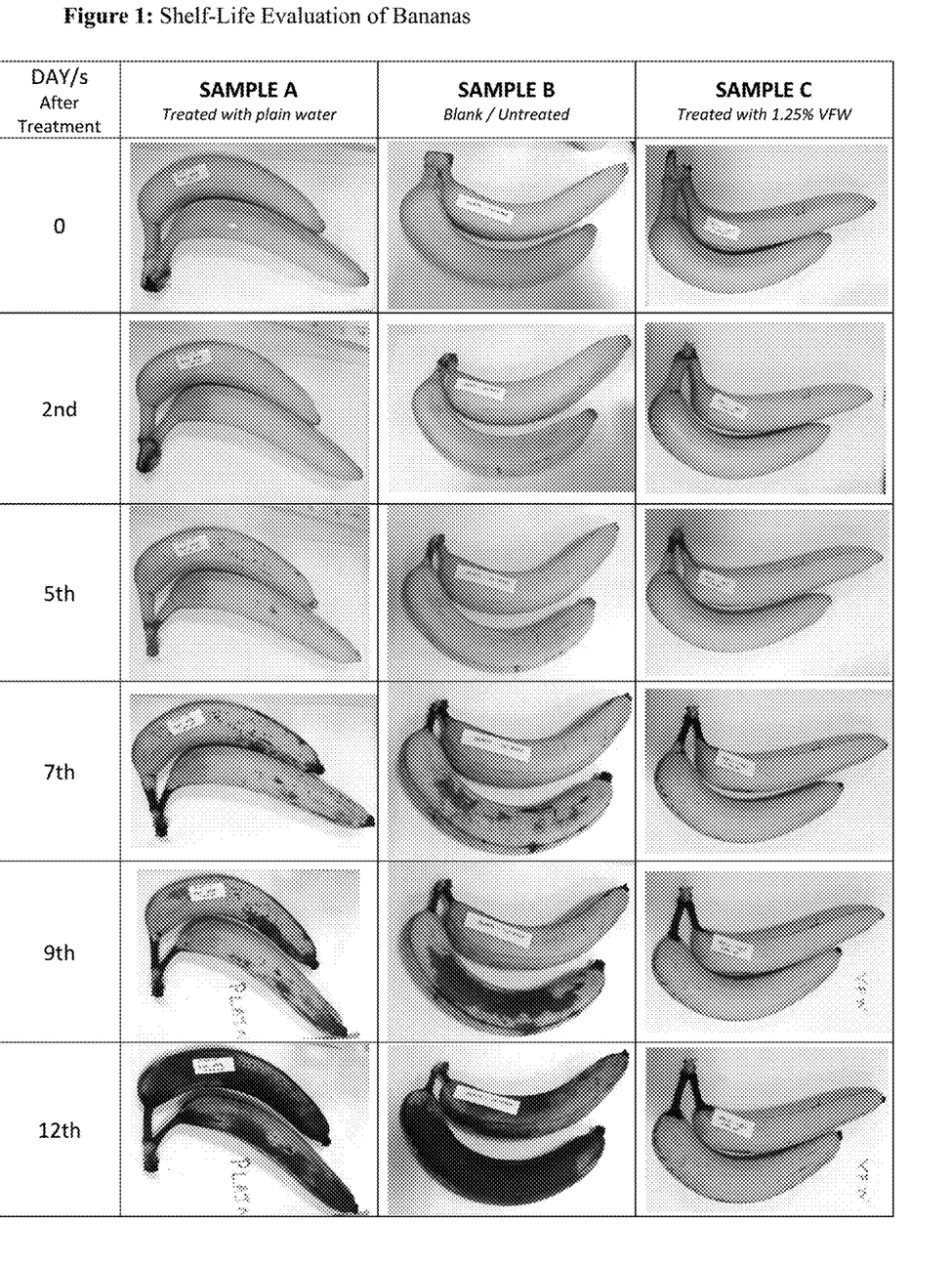
FIG. 1 illustrated shelf-life evaluation of bananas

All the banana samples are kept in the same room condition and are observed in 12-day duration as shown in FIG. 1.

FIG. 1 show pictures of Bananas washed in 1.25% of Vegetable and Fruit Wash solution in water having the least blackening/black spots and have less ripened as compared to the Bananas washed with plain water and the untreated Bananas. The table also confirmed that Bananas washed in 1.25% VFW solution in water have a longer life-span.

In an embodiment of the present invention there is provided a vegetable and fruit wash composition which at 1.25% solution in water prevents ripening in Banana in household environment and thus increases the shelf life.

Example 6: Comparison with Other Vegetable and Fruit Wash Formulations Having Same Components The synergy of the components at particular concentration of the present invention is further compared with the vegetable fruit wash solutions having same components at varied percentage weight.

Two formulations are created using similar ingredients as the present invention, T1 having 37% Cocoamide Ethanolamine as a non-ionic surfactant, 10% Cocoamidopropyl (Amide)Betaine as amphoteric surfactant, 16% Glycolipid and 37% water; T2 having 57% Cocoamide Ethanolamine as a non-ionic surfactant, 25% Coco amphoacetate as amphoteric surfactant and 25% Glycolipid. This test is performed to determine the uniqueness of the VFW composition with respect to T1 and T2, wherein the components of the VFW composition consists of 25-30% of a nonionic surfactant, 30-65% of an amphoteric surfactant and 5-15% of glycolipids.

The concentration of the two formulations:

| Sr. No. | Material Name | Concentration |
|---|---|---|
| | T1 | |
| 1 | Cocoamide Ethanolamine | 37% |
| 2 | Cocoamidopropyl (Amide)Betaine | 10% |
| 3 | Glycolipid | 16% |
| 4 | Water | 37% |
| | TOTAL | 100% |
| | T2 | |
| 1 | Cocoamide Ethanolamine | 50% |
| 2 | Coco amphoacetate | 25% |
| 3 | Glycolipid | 25% |
| | TOTAL | 100% |

Two bananas are dipped in a 1.25% solution of T1 in water for 5 min and then left to dry in room temperature. The sample is labelled as Sample D. Another two bananas are dipped in a 1.25% solution of T2 in water for 5 min and left to dry in room temperature. This sample is labelled as Sample E. The observations are recorded and shown in FIG. 2.

Figure 2:
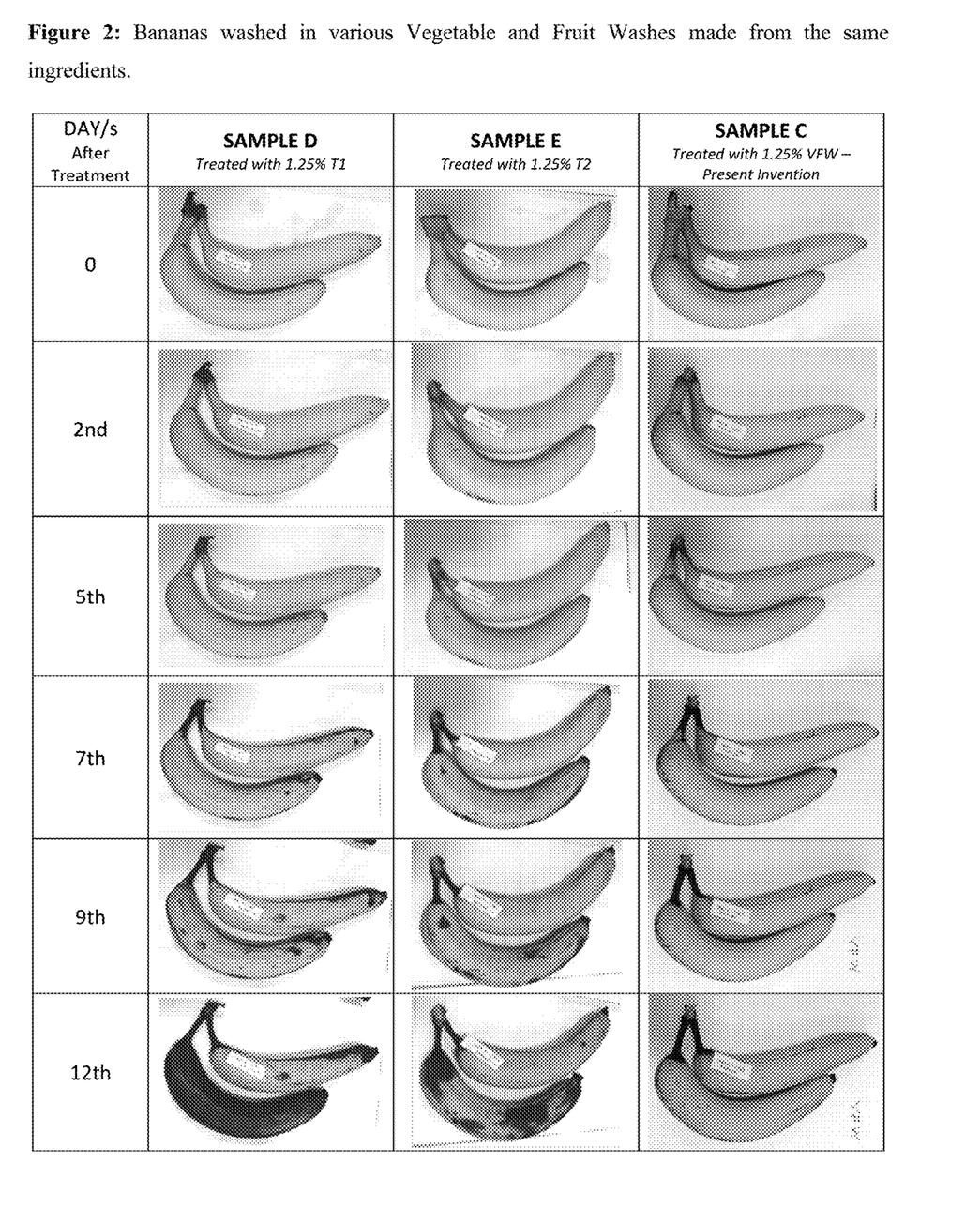
FIG. 2 illustrated Bananas washed in various Vegetable and Fruit Washes made from the same ingredients.

FIG. 2 shows the pictures of Bananas treated in 1.25% of the vegetable and fruit wash solutions T1, T2 and the present invention. Bananas treated in 1.25% of the Vegetable and Fruit Wash solution in water showed the least blackening/black spots and rotting issues as compared to the Bananas washed in T1 and T2 vegetable and fruits washes, which also exhibits the ability of VFW solution in increasing the shelf life.

The test confirmed the synergistic effect of the VFW composition with respect to other vegetable and fruit wash solutions T1 and T2 having the same components but in different percentage weight.

Advantages of the Invention: The present invention is an environmentally friendly vegetable and fruit wash composition without sulfates, phosphates, chlorine containing substance, and harmful solvents. The unique composition of the vegetable and fruit wash effectively removes pesticides and insecticides on the fruits and vegetables. It is also effective in removingthe broad class microorganisms, dirt, and mud from the surface of fruits and vegetables and thereby prevents premature ripening like crow rot disease in banana.

The composition is thus also effective in prolonging the life of fruits and vegetables while in storage and increase the shelf life.

The invention claimed is:

1. A vegetable and fruit wash composition consisting of 25-30% weight of a nonionic surfactant, 30-65% weight of an amphoteric surfactant and 5-15% weight of glycolipid, wherein the nonionic surfactant comprises alkyl glucoside or alkyl polyglucosides selected from $C_6$-$C_{12}$ alcohol surfactant or mixtures thereof; the amphoteric surfactant comprises Betaines or Sultaines selected from cocamidopropyl (amide) betaine, cocoaminobetaine, cocoamido hydroxypropyl sultaine, cocoamphodiacetate, or mixtures thereof and the glycolipid comprises sophorolipid or rhamnolipid or mixtures thereof; such that the composition is safe and non-toxic at 200 µg/ml concentration.

2. The vegetable and fruit wash composition as claimed in claim 1 wherein the alkyl glucoside or alkyl polyglucosides are selected from $C_8$-$C_{10}$ alcohol surfactant or mixtures thereof.

3. The vegetable and fruit wash composition as claimed in claim 1, wherein the composition naturally degrades by 81% in 28 days as per OECD 302B test method.

4. The vegetable and fruit wash composition as claimed in claim 1, wherein 1-3% weight of the composition in water is effective in removing dirt, wax residues, insecticides/pesticides residues and microorganisms from the surface of vegetables and fruits.

5. The vegetable and fruit wash composition as claimed in claim 1, wherein 1-3% weight aqueous solution of the composition is effective in removing more than 90% of insecticides/pesticides residues from the surface of vegetables and fruits.

6. The vegetable and fruit wash composition as claimed in claim 1, wherein 1-3% weight aqueous solution of the composition is effective in removing more than 50% of insecticides/pesticides residues from the surface of tea leaves.

7. The vegetable and fruit wash composition as claimed in claim 1, wherein 1-3% weight aqueous solution of the composition is effective in preventing crown-rot disease in vegetables and fruits.

8. The vegetable and fruit wash composition as claimed in claim 1, wherein 1-3% weight aqueous solution of the composition is effective to control the premature ripening of vegetables and fruits and thereby is effective in increasing the shelf life of vegetables and fruits.

* * * * *